(12) United States Patent
Thomas et al.

(10) Patent No.: US 7,547,160 B2
(45) Date of Patent: Jun. 16, 2009

(54) METHOD OF DELIVERING A TREATMENT SUBSTANCE TO A TARGET SUBSTANCE IN A TREATMENT ZONE

(76) Inventors: David G. Thomas, 1 Havelock Street, West Perth, WA (AU) 6005; David Reynolds, Mailstop MO15, School of Environmental Systems Eng The Univ of Western Australia, 35 Stirling Highway, Crawley, WA (AU) 6009

( * ) Notice: Subject to any disclaimer, the term of this patent is extended or adjusted under 35 U.S.C. 154(b) by 77 days.

(21) Appl. No.: 11/609,264

(22) Filed: Dec. 11, 2006

(65) Prior Publication Data

US 2008/0135413 A1    Jun. 12, 2008

(51) Int. Cl.
B09B 1/00 (2006.01)
(52) U.S. Cl. .................................... 405/128.5
(58) Field of Classification Search ............. 405/128.1, 405/128.15, 128.45, 128.5
See application file for complete search history.

(56) References Cited

U.S. PATENT DOCUMENTS 6,086,739 A * 7/2000 Hodko ................ 204/515
7,334,965 B2 * 2/2008 Yang ................... 405/128.75

FOREIGN PATENT DOCUMENTS

WO   WO 2005053866 A1 *   6/2005

OTHER PUBLICATIONS

Roach, Nicole, et al. Electrokinetic delivery of permanganate into low-permeability soils. Int. J. Environment and Waste Management, vol. 1, No. 1, 2006.*

* cited by examiner

*Primary Examiner*—John Kreck
(74) *Attorney, Agent, or Firm*—Davis Wright Tremaine LLP; George C. Rondeau, Jr.

(57) ABSTRACT

A method of delivering a treatment substance to a target substance in a treatment zone is disclosed. The method comprises providing a treatment substance responsive to an electric or magnetic field such that the treatment substance experiences a kinetic force when disposed in said field, providing an electric or magnetic field extending through a treatment zone, and disposing the treatment substance in the electric or magnetic field such that the treatment substance moves towards the treatment zone and contributes to a reaction with the target substance. A corresponding system is also disclosed.

32 Claims, 3 Drawing Sheets

METHOD OF DELIVERING A TREATMENT SUBSTANCE TO A TARGET SUBSTANCE IN A TREATMENT ZONE

FIELD OF THE INVENTION

The present invention relates to a method of and system for delivering a treatment substance to a target substance in a treatment zone.

BACKGROUND OF THE INVENTION

The invention has particular application to a method of and system for delivering a treatment substance to dense non-aqueous phase liquids (DNAPLs) and their associated dissolved phase contaminant plumes in a treatment zone for the purpose of removing and/or remediating contaminants from the zone. However, it will be understood that the invention has other applications such as delivery of a treatment substance to light non-aqueous phase liquids (LNAPLs) and heap leaching processes.

Dense non-aqueous phase liquids (DNAPLs) have been widely used in industry since the beginning of the $20^{th}$ century. DNAPLs are only slightly soluble in water and being denser than water tend to migrate to regions below the water table where they slowly dissolve into flowing groundwater. As a consequence, a release of DNAPLs can lead to long term contamination of groundwater. Common DNAPLs include creosote, transformer and insulating oils containing polychlorinated biphenyls (PCB), coal tar, and chlorinated solvents such as trichloroethylene (TCE) and tetrachloroethylene (PCE).

Treatment of sub-surface zones contaminated with DNAPLs is difficult because of uncertainty as to location of the DNAPLs in the sub-surface environment, and because the sub-surface architecture is generally heterogeneous and complex.

An example of an existing method of treating a contaminated sub-surface zone is shown in FIGS. 1 and 2.

In FIG. 1, a sub-surface zone 10 is exposed to a contaminant 12 emanating from a contaminant source 14. Since the contaminant is a DNAPL, the contaminant 12 is relatively dense and migrates downwardly past the water table 16, through relatively high permeability portions 18 of the sub-surface zone 10 and around relatively low permeability portions 20.

As shown in FIG. 2, after a prolonged period of time the contaminant 12 diffuses and advects outwardly into the surrounding high and low permeability portions 18, 20.

In order to remediate the contaminated sub-surface zone 10, a boring device 22 is used to bore a hole 24 in the sub-surface zone 10, and a treatment substance is pumped into the hole 24. The treatment substance subsequently migrates into the surrounding sub-surface and destroys or neutralizes any contaminant encountered. However, with this method it is difficult to ensure that the treatment substance is delivered to all contaminant material in the sub-surface zone, and in particular it is difficult to ensure migration of the treatment substance into relatively low permeability portions of the sub-surface zone as this migration is limited to the relatively slow rates of molecular diffusion. As a consequence, methods for treating NAPL contaminants and their associated dissolved portions in sub-surface zones have hitherto had limited success.

SUMMARY OF THE INVENTION

In accordance with a first aspect of the present invention, there is provided a method of delivering a treatment substance to a target substance in a treatment zone, said method comprising:
  providing a treatment substance responsive to an electric or magnetic field such that the treatment substance experiences a kinetic force when disposed in said field;
  providing an electric or magnetic field extending through a treatment zone; and
  disposing the treatment substance in the electric or magnetic field such that the treatment substance moves towards the treatment zone and thereby contributes to a reaction with the target substance.

In one embodiment, the method comprises providing an electric field, and applying the electric field across electrodes disposed such that the treatment zone is located between the electrodes.

In one arrangement, the treatment zone is a sub-surface treatment zone and the target substance comprises a DNAPL, a LNAPL, or is present in a dissolved or sorbed form.

The treatment substance may comprise potassium permanganate.

In addition or alternatively, the treatment substance may comprise a nanoscale or microscale particulate treatment substance such as nanoscale zero valent iron (nZVI).

In addition or alternatively, the treatment substance may comprise a catalyst.

In addition or alternatively, the treatment substance may comprise a nutrient, cometabolyte, or growth substrate for biological activity.

In an embodiment wherein the treatment zone is a sub-surface treatment zone, the method may further comprise providing first and second electrodes extending into the ground, and introducing the treatment substance between the treatment zone and one of the electrodes.

The treatment substance may be introduced between the treatment zone and one of the electrodes by forming a hole in the ground between an electrode and the treatment zone and disposing the treatment substance in the hole, by introducing the treatment substance through an access port, by direct injection, or in any other suitable way.

In one embodiment, the step of providing an electric field comprises providing a voltage gradient across the treatment zone of approximately 1 to 5 v/cm.

In one arrangement, the method further comprises adding a buffer to the treatment zone so as to control the pH of the treatment zone.

In an alternative embodiment, the method comprises providing a magnetic field.

In one arrangement, the treatment zone is disposed above ground. Such an above ground treatment zone may comprise ore containing target metal and the treatment substance may comprise acid.

In accordance with a second aspect of the present invention, there is provided a system for delivering a treatment substance to a target substance in a treatment zone, said system comprising:
  a treatment substance responsive to an electric or magnetic field such that the treatment substance experiences a kinetic force when disposed in said field; and an electric or magnetic field generator arranged during use to generate an electric or magnetic field extending through a treatment zone such that when the treatment substance is disposed in the electric or electromagnetic field the treatment substance moves towards the treatment zone and thereby contributes to a reaction with the target substance.

In one embodiment, the system comprises an electric field generator and electrodes disposed during use such that the treatment zone is located between the electrodes, and the electric field generator is arranged to apply the electric field across the electrodes.

In one embodiment, the electric field generator is arranged to generate a voltage gradient across the treatment zone of approximately 1 to 5 v/cm.

In one arrangement, the treatment zone is a sub-surface treatment zone and the target substance comprises a DNAPL.

The treatment substance may comprise potassium permanganate.

In addition or alternatively, the treatment substance may comprise a nanoscale or microscale particulate treatment substance such as nanoscale zero valent iron (nZVI).

In addition or alternatively, the treatment substance may comprise a catalyst.

In addition or alternatively, the treatment substance may comprise a nutrient, cometabolyte, or growth substrate for biological activity.

In an embodiment wherein the treatment zone is a sub-surface treatment zone, the electrodes may be disposed during use so as to extend into the ground.

The system may further comprise a hole formed in the ground between an electrode and the treatment zone, the hole receiving the treatment substance during use.

In an alternative embodiment, the system comprises a magnetic field generator.

In one arrangement, the treatment zone is disposed above ground. Such an above ground treatment zone may comprise ore containing target metal and the treatment substance may comprise acid arranged to react with the target metal so as to leach the target metal from the ore.

BRIEF DESCRIPTION OF THE DRAWINGS

The present invention will now be described, by way of example only, with reference to the accompanying drawings, in which.

DESCRIPTION OF AN EMBODIMENT OF THE PRESENT INVENTION

Figure 3:
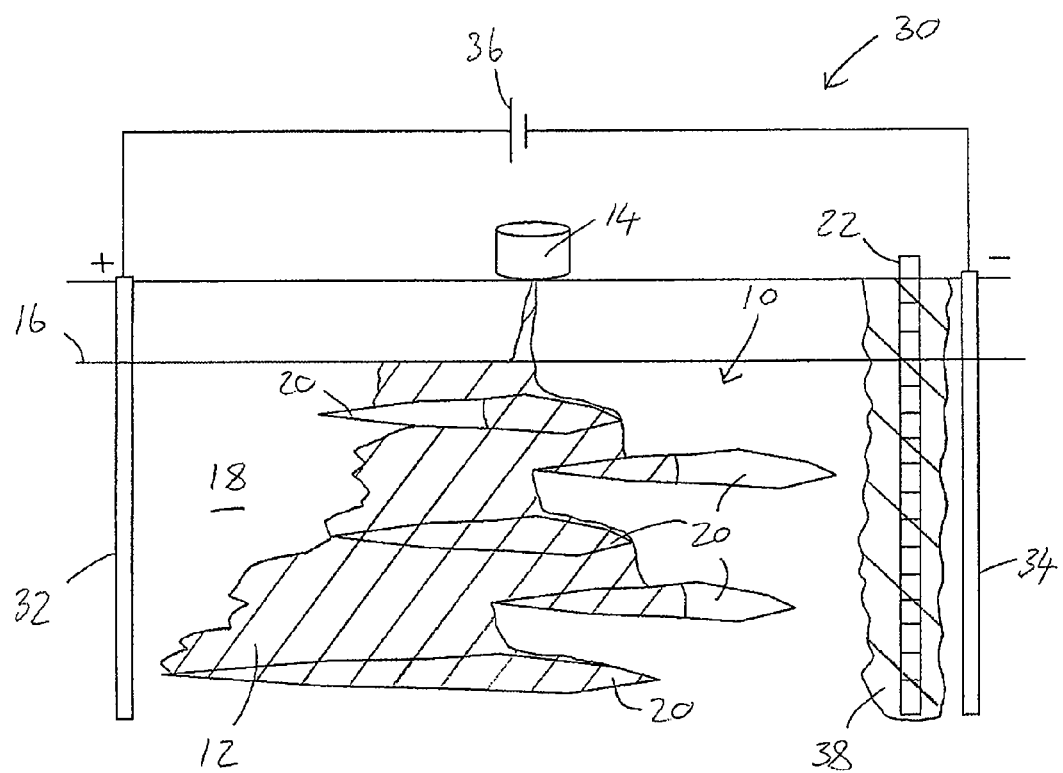
FIG. 3 is a diagrammatic representation of a contaminated sub-surface zone including a system for delivering a treatment substance to a target substance in the treatment zone in accordance with an embodiment of the present invention.

Referring to FIG. 3, a system 30 for treating a sub-surface zone 10 in accordance with an embodiment of the present invention is illustrated.

Figure 1:
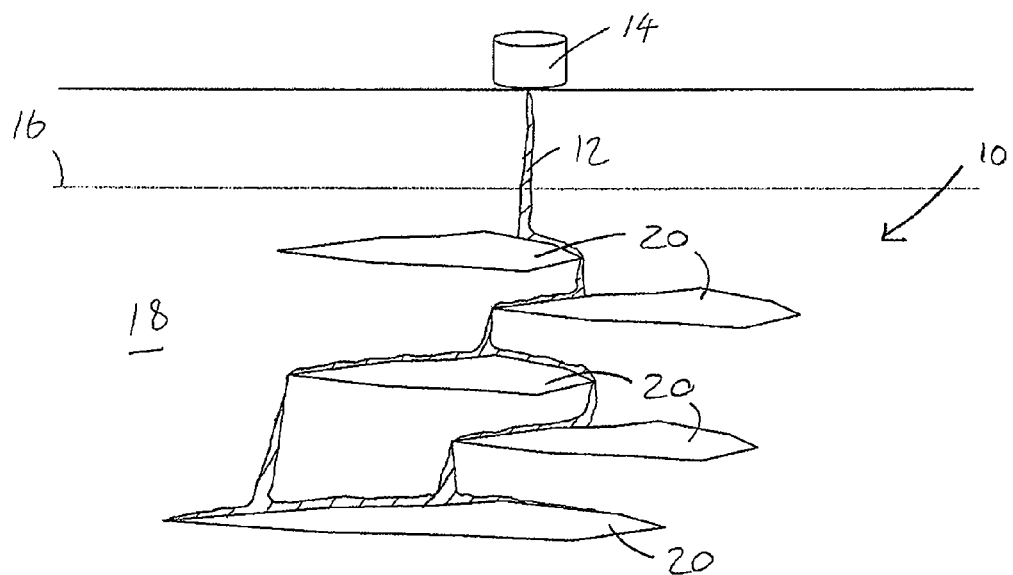
FIG. 1 is a diagrammatic representation of a sub-surface zone shortly after spillage of a contaminant has occurred.
Figure 2:
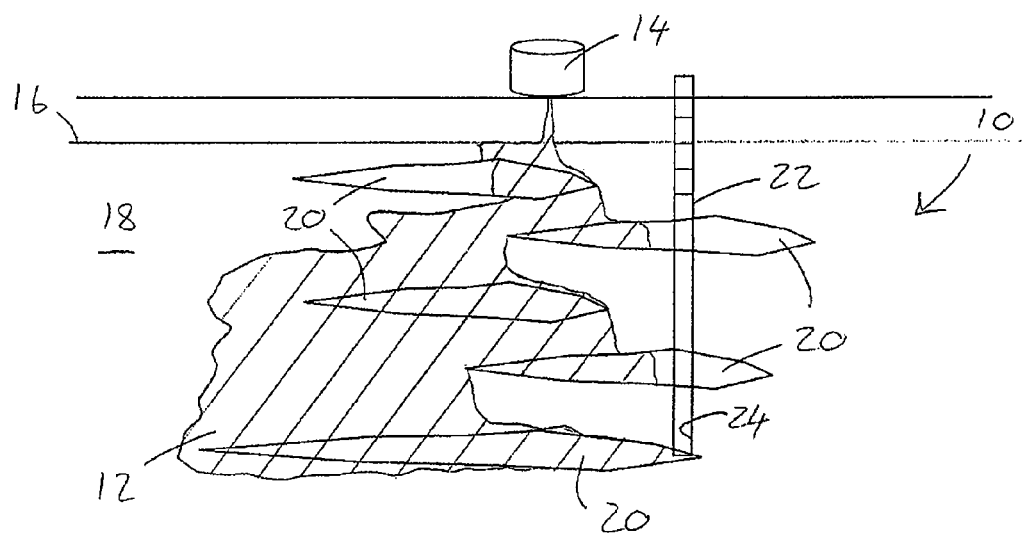
FIG. 2 is a diagrammatic representation of the sub-surface zone shown in FIG. 1 after a prolonged period of time and including a prior art system for treating contaminants in the sub-surface zone.

Features which are the same as or similar to features shown in FIGS. 1 and 2 are indicated with like reference numerals.

The system 30 includes a first electrode 32 which in this example corresponds to an anode, a second electrode 34 which in this example corresponds to a cathode, and a field generator 36 which in this example produces a DC voltage which generates an electric field extending through the sub-surface zone 10 between the first and second electrodes 32, 34.

The system 30 also includes a treatment substance 38 which is introduced into the sub-surface zone 10 by forming a hole 24, for example using a boring device 22, at a location adjacent the sub-surface zone 10 desired to be treated and adjacent the cathode 34.

It will be understood that by applying a DC voltage across the anode 32 and the cathode 34, and by introducing the treatment substance 38 adjacent the cathode 34, treatment substance ions or particles are urged by the electric field to migrate towards the anode 32 through the sub-surface zone 10.

It will also be understood that the migration rate of ions, charged particles, and metals through a porous medium using electric or magnetic fields is substantially independent of the hydraulic conductivity of the medium and, as such, migration of treatment substance to contaminants 12 in a sub-surface zone 10 using a method in accordance with the present invention is much more likely to deliver the treatment substance ions to relatively low permeability portions of the sub-surface zone 10 than remediation methods based on hydraulic treatment substance delivery.

In this example, the contaminant 12 is a DNAPL material such as chlorinated ethylenes and the treatment substance is potassium permanganate $KMnO_4$. In this way, by delivering permanganate ion $MnO_4^-$ to the contaminant 12 in situ chemical oxidation of the chlorinated ethylenes occurs which has the effect of remediating the sub-surface zone 10. The following equation is representative of the redox reaction occurring between chlorinated ethylene materials such as trichloroethylene (TCE) and permanganate ions:

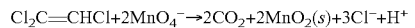

$$Cl_2C{=}CHCl + 2MnO_4^- \rightarrow 2CO_2 + 2MnO_2(s) + 3Cl^- + H^+$$

However, it will be understood that other contaminants and other treatment substances are envisaged, the important aspect being that the treatment substance experiences a kinetic force in the presence of an applied field, and delivery of the treatment substance to the contaminant 12 causes a reaction to occur between the treatment substance and the contaminant 12 and thereby remediation of the contaminated sub-surface zone 10.

Other suitable treatment substances include nanoscale or microscale particulate materials such as nanoscale zero valent iron (nZVI), and catalysts, nutrients, cometabolytes or growth substrates for biological activity.

Other suitable contaminants for which the present invention is also applicable include light non-aqueous phase liquids (LNAPLs). Such LNAPLs are liquids that are sparingly soluble in water and less dense than water, including in particular relatively low density hydrocarbons.

Other suitable contaminants for which the present invention is also applicable include dissolved phase contaminants, and contaminants sorbed to solids in the treatment zone.

Application of an electric field to the sub-surface treatment zone 10 also causes electrolysis of water in the sub-surface zone 10 and as a consequence the pH reduces significantly. In order to maintain the pH relatively neutral, a suitable buffer such as sodium bicarbonate may be added.

In this example, the treatment substance 38 is delivered to the contaminant 12 by applying a DC electric field across the first and second electrodes 32, 34. However, it will be understood that alternative arrangements are envisaged. For example, the field generator may be arranged to generate a magnetic field which passes through the sub-surface zone 10 with the magnetic field being arranged so as to induce movement of the treatment substance across the contaminant 12. Application of a magnetic field instead of an electric field may have particular advantages because unlike an applied electric field an applied magnetic field does not case electrolysis of water and the associated problems with decreasing pH.

Figure 4:
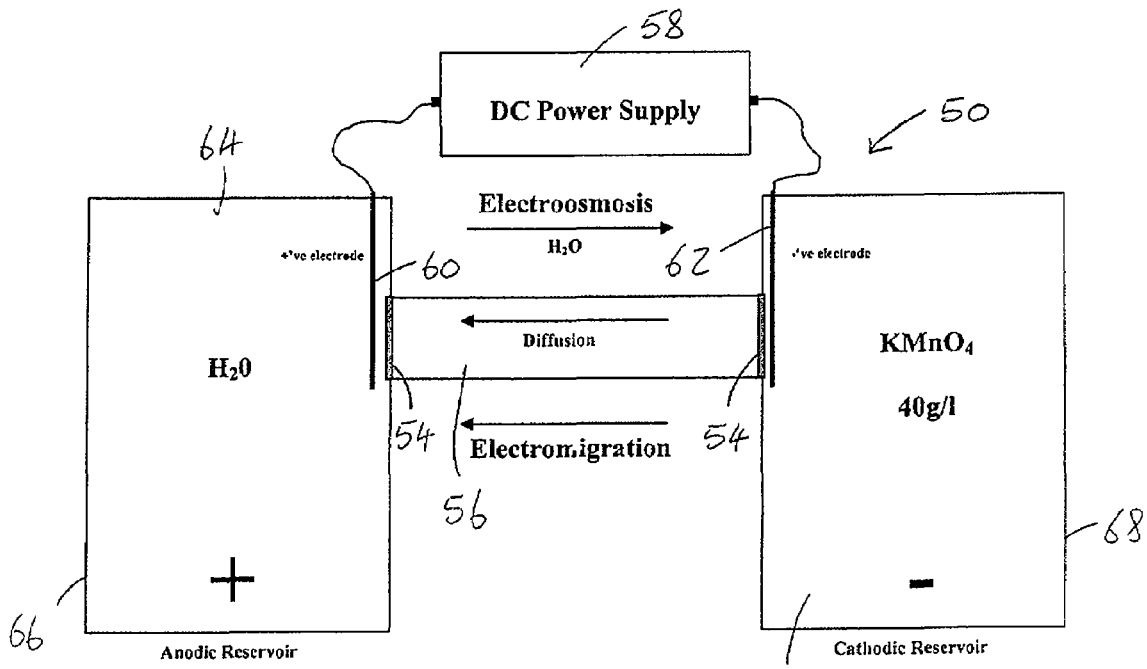
FIG. 4 is a diagrammatic representation of a test system useable to carry out tests on a method of delivering a treatment substance to a target substance in accordance with an embodiment of the present invention.

A test system 50 shown in FIG. 4 demonstrates the capability of the method and system of the present invention in delivering treatment substance 38 to a target substance in a treatment zone 10.

The test system 50 includes a Perspex pipe 52, in this example having dimensions 7 cm long×5 cm diameter. In this example, a relatively low permeability portion 56 in the form of clay is disposed in the pipe 52. In this example, the clay 56 is Walkers Ultra White kaorlinitic clay. Ends of the pipe include filters 54.

The test system also includes a DC power supply 58, a first electrode 60 corresponding to an anode, and a second electrode 62 corresponding to a cathode. In the present example, the DC power supply 58 is arranged to generate voltages across the first and second electrodes 60, 62 of approximately 10 and 20 volts, which corresponds to electrical gradients of approximately 1.425 volts/cm and 2.85 volts/cm.

The system 50 also includes anodic and cathodic reservoirs 66 and 68 respectively, the first electrode 60 extending into the anodic reservoir 66 and the second electrode 62 extending into the cathodic reservoir 68. Each of the anodic and cathodic reservoirs 66, 68 is in the form of a 12/ tank containing NaCl solution in a concentration such that the conductivity of the solution matches typical groundwater conditions.

The cathodic reservoir 68 also includes treatment substance in the form of potassium permanganate $KMnO_4$ solution at a concentration of approximately 40 grams/l.

The test was carried out for a period of 8 days.

Figure 5:
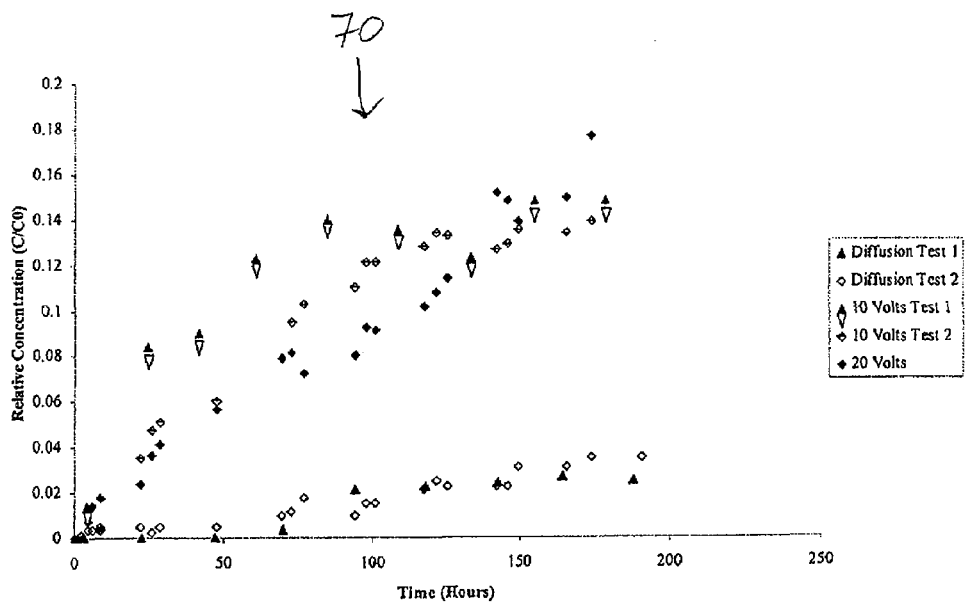
FIG. 5 is a plot showing test results obtained from the test system shown in FIG. 4.

Results of the tests carried out using the test device 50 are illustrated by the test results 70 shown in FIG. 5.

The test results 70 indicate that when 10 volts (equivalent to an electrical gradient of 1.425 Volts/cm) was applied across the clay core, the relative concentration in the anodic reservoir 66 was seven-fold the rates for diffusion after an 8 day period. A relatively rapid response occurred when the voltage was switched on with a ten-twenty fold increase in the relative concentrations recorded in the anodic reservoir 66 after 24 hours. Both of these tests were repeated providing similar results. When 20 Volts (equivalent to an electrical gradient of 2.85 Volts/cm gradient) was applied across the clay specimen, the relative concentration values recorded in the anodic reservoir 66 did not improve, and were lower than the results obtained for the 10 Volt test.

While the above embodiment is described in relation to delivery of a treatment substance to a contaminated sub-surface zone for the purpose of remediation, it will be understood that the invention has other applications. For example, the system and method of the present invention may be used in any application where it is desirable to deliver a treatment substance to a target substance located in a porous medium.

In one such alternative arrangement, the target substance may be disposed in ore material and the ore material disposed above ground, and target substances such as metals may be extracted from the ore material using an improved heap leaching process wherein treatment substance acid is delivered to the target metals by application of a suitable electric field.

Modifications and variations as would be apparent to a skilled addressee are deemed to be within the scope of the present invention.

The invention claimed is:

1. A method of delivering a treatment substance to a target substance in a treatment zone, said method comprising:
   providing a treatment substance responsive to an electric or magnetic field such that the treatment substance experiences a kinetic force when disposed in said field;
   providing an electric or magnetic field extending through a treatment zone; and
   disposing the treatment substance in the electric or magnetic field such that the treatment substance moves towards the treatment zone and thereby contributes to a reaction with the target substance;
   wherein the treatment substance is potassium permanganate.

2. A method as claimed in claim 1, further comprising providing an electric field, and applying the electric field across electrodes disposed such that the treatment zone is located between the electrodes.

3. A method as claimed in claim 1, wherein the treatment zone is a sub-surface treatment zone and the target substance comprises a DNAPL, a LNAPL, or is present in a dissolved or sorbed form.

4. A method as claimed in claim 2, wherein the treatment zone is a sub-surface treatment zone, and the method further comprises providing first and second electrodes extending into the ground, and introducing the treatment substance into the ground between an electrode and the treatment zone.

5. A method as claimed in claim 2, wherein the step of providing an electric field comprises providing a voltage gradient across the treatment zone of approximately 1.67 v/cm.

6. A method as claimed in claim 1, wherein the method comprises providing a magnetic field.

7. A method as claimed in claim 1, wherein the treatment zone is disposed above ground.

8. A method as claimed in claim 2, further comprising adding a buffer to the treatment zone so as to raise the pH of the treatment zone.

9. A system for delivering a treatment substance to a target substance in a treatment zone, said system comprising:
   a treatment substance responsive to an electric or magnetic field such that the treatment substance experiences a kinetic force when disposed in said field;
   an electric or magnetic field generator arranged during use to generate an electric or magnetic field extending through a treatment zone such that when the treatment substance is disposed in the electric or electromagnetic field the treatment substance moves towards the treatment zone and thereby reacts with the target substance;
   wherein the treatment substance comprises potassium permanganate.

10. A system as claimed in claim 9, wherein the system comprises an electric field generator and electrodes disposed during use such that the treatment zone is located between the electrodes, and the electric field generator is arranged to apply the electric field across the electrodes.

11. A system as claimed in claim 10, wherein the electric field generator is arranged to generate a voltage gradient across the treatment zone of approximately 1.67 v/cm.

12. A system as claimed in claim 9, wherein the treatment zone is a sub-surface treatment zone and the target substance comprises a DNAPL, a LNAPL, or is present in a dissolved or sorbed form.

13. A system as claimed in claim 9, wherein the treatment zone is a sub-surface treatment zone and the electrodes are disposed so as to extend into the ground.

14. A system as claimed in claim 13, whereby the treatment substance is introduced into the ground between an electrode and the treatment zone.

15. A system as claimed in claim 9, wherein the system comprises a magnetic field generator.

16. A system as claimed in claim 9, wherein the treatment zone is disposed above ground.

17. A method of delivering a treatment substance to a target substance in a treatment zone, said method comprising:
   providing a treatment substance responsive to an electric or magnetic field such that the treatment substance experiences a kinetic force when disposed in said field;
   providing an electric or magnetic field extending through a treatment zone; and
   disposing the treatment substance in the electric or magnetic field such that the treatment substance moves towards the treatment zone and thereby contributes to a reaction with the target substance;
   wherein the treatment substance comprises a nanoscale or microscale particulate treatment substance.

18. A method as claimed in claim 17, further comprising providing an electric field, and applying the electric field across electrodes disposed such that the treatment zone is located between the electrodes.

19. A method as claimed in claim 17, wherein the treatment zone is a sub-surface treatment zone and the target substance comprises a DNAPL, a LNAPL, or is present in a dissolved or sorbed form.

20. A method as claimed in claim 17, wherein the treatment substance comprises nanoscale zero valent iron particles (nZVI).

21. A method as claimed in claim 18, wherein the treatment zone is a sub-surface treatment zone, and the method further comprises providing first and second electrodes extending into the ground, and introducing the treatment substance into the ground between an electrode and the treatment zone.

22. A method as claimed in claim 17, wherein the method comprises providing a magnetic field.

23. A method as claimed in claim 17, wherein the treatment zone is disposed above ground.

24. A method as claimed in claim 18, further comprising adding a buffer to the treatment zone so as to raise the pH of the treatment zone.

25. A method of delivering a treatment substance to a target substance in a treatment zone, said method comprising:
   providing a treatment substance responsive to an electric or magnetic field such that the treatment substance experiences a kinetic force when disposed in said field;
   providing an electric or magnetic field extending through a treatment zone; and
   disposing the treatment substance in the electric or magnetic field such that the treatment substance moves towards the treatment zone and thereby contributes to a reaction with the target substance;
   wherein the treatment substance comprises a redox agent.

26. A method as claimed in claim 25, further comprising providing an electric field, and applying the electric field across electrodes disposed such that the treatment zone is located between the electrodes.

27. A method as claimed in claim 25, wherein the treatment zone is a sub-surface treatment zone and the target substance comprises a DNAPL, a LNAPL, or is present in a dissolved or sorbed form.

28. A method as claimed in claim 25, wherein the treatment substance comprises potassium permanganate.

29. A method as claimed in claim 26, wherein the treatment zone is a sub-surface treatment zone, and the method further comprises providing first and second electrodes extending into the ground, and introducing the treatment substance into the ground between an electrode and the treatment zone.

30. A method as claimed in claim 25, wherein the method comprises providing a magnetic field.

31. A method as claimed in claim 25, wherein the treatment zone is disposed above ground.

32. A method as claimed in claim 26, further comprising adding a buffer to the treatment zone so as to raise the pH of the treatment zone.

* * * * *